United States Patent [19]
Yonezawa et al.

[11] Patent Number: 5,473,581
[45] Date of Patent: Dec. 5, 1995

[54] MAGNETO-OPTICAL DATA RECORDING SYSTEM CONTINUOUSLY IRRADIATING OPTICAL PULSERS

[75] Inventors: Seiji Yonezawa, Hachioji; Norio Ohta, Iruma; Toshio Niihara, Sayama; Keiji Kataoka, Kawagoe; Masahiko Takahashi, Hachioji; Harukazu Miyamoto, Kodaira; Hirofumi Sukeda, Kokubunji; Toshiaki Tsuyoshi, Kawasaki, all of Japan

[73] Assignee: Hitachi, Ltd., Tokyo, Japan

[21] Appl. No.: 979,338

[22] Filed: Nov. 20, 1992

Related U.S. Application Data

[63] Continuation of Ser. No. 353,602, May 18, 1989, Pat. No. 5,170,383.

[30] Foreign Application Priority Data

May 20, 1988 [JP] Japan .................................. 63-121734

[51] Int. Cl.$^6$ ...................................................... G11B 11/00
[52] U.S. Cl. ........................... 369/13; 360/59; 360/114
[58] Field of Search ............................... 369/13, 49, 47, 369/48, 44.11, 32, 275.1, 275.2, 275.3, 275.4, 124; 360/59, 114; 365/122; 250/201.5

[56] References Cited

U.S. PATENT DOCUMENTS

| | | | |
|---|---|---|---|
| 4,882,718 | 11/1989 | Kryder et al. | 369/13 |
| 4,907,211 | 3/1990 | Horimai et al. | 369/13 |
| 4,949,325 | 8/1990 | Tsuyoshi et al. | 369/49 |
| 5,014,254 | 5/1991 | Van Rosmalen et al. | 369/13 |
| 5,126,985 | 6/1992 | Spruit et al. | 369/13 |
| 5,155,714 | 10/1992 | Inoue | 369/13 |
| 5,170,383 | 12/1992 | Yonezawa et al. | 369/13 |

FOREIGN PATENT DOCUMENTS 61-190742  8/1986  Japan .

*Primary Examiner*—Ali Neyzari
*Attorney, Agent, or Firm*—Antonelli, Terry, Stout & Kraus

[57] ABSTRACT

A magneto-optical data recording system comprises magnetic field pulse applying apparatus for applying to a magneto-optic recording medium a magnetic field pulse of a polarity corresponding to code data to be recorded, and apparatus for heating the recording medium in a pulsating manner at a predetermined frequency synchronous with the code data to be recorded. During recording, the magnetic field pulse applying apparatus applies a magnetic field pulse of a polarity corresponding to code data along a track of the recording medium and the heating apparatus continuously heats the recording medium in a pulsating manner at a predetermined frequency synchronous with the code data to thereby directly overwrite the code data. The magnetic field pulse applying apparatus includes a magnetic coil driven by code data from a source of code data (data generator). The heating apparatus includes an optical head which comprises a source of laser beam driven by a laser driver and an optical system which focuses the laser beam from the source of laser beam as a small light spot onto the recording medium.

15 Claims, 5 Drawing Sheets

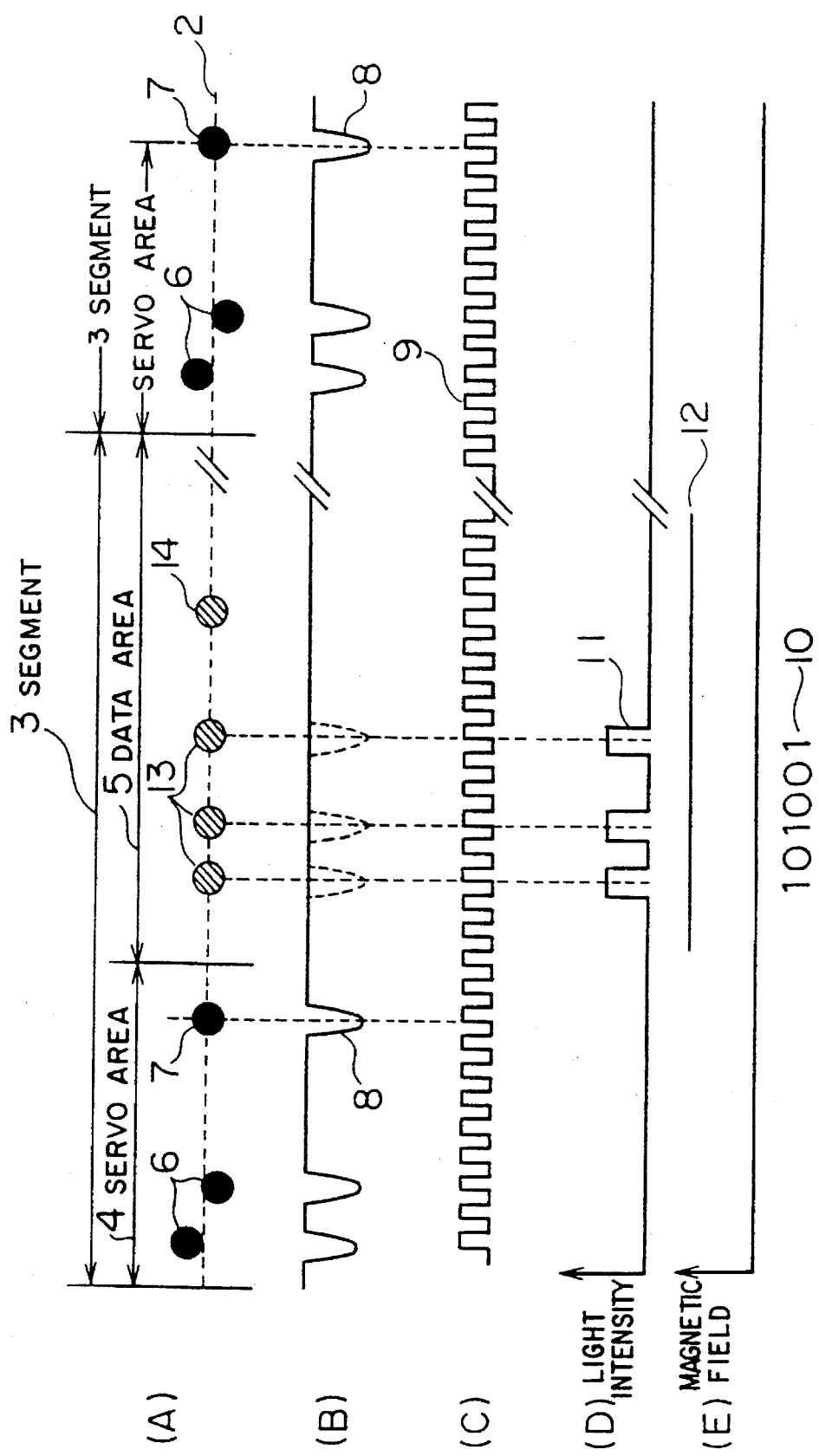

MAGNETO-OPTICAL DATA RECORDING SYSTEM CONTINUOUSLY IRRADIATING OPTICAL PULSERS

This is a continuation of application Ser. No. 07/353,602, filed May 18, 1989, now U.S. Pat. No. 5,170,383.

BACKGROUND OF THE INVENTION

The present invention relates to magneto-optical data recording systems, and more particularly to such systems which are capable of overwriting new coded data on old data.

At present, most magneto-optical data recording systems erase old data and then write new data, so that the disc used must be rotated at least twice, once for erasing the old data from the disc and once for writing new data on the disc. This is because it is difficult to directly overwrite new data on the old data.

For example, in Japanese Patent Publication JP-A-52-23318, data is recorded on a thin magneto-optic layer by the interaction of a laser and a magnetic coil for generating a magnetic field. Namely, a magnetic domain is formed at a position heated by the laser beam using a magnetic field lower than magnetic coercive force in the thin layer. In this arrangement, a pulsated modulated laser beam and a direct current magnetic field are used corresponding to the coded data. According to this method, new data cannot be directly written so long as old data remains.

In Japanese Patent Publication JP-A-51-107121, a modulated magnetic field pulsated with coded data and a direct current laser beam are used. According to this method, new data can be directly overwritten on a disc where old data remains. However, in this method, the laser beam is irradiated onto the recording film with a constant light power, so that the recording film is overheated for longer time and the shape of the formed magnetic domain is not circular, but crescent. This method is problematic in signal processing.

Further, in Japanese Patent Publication JP-A-62-252553, a high frequency self-oscillating magnetic field generated by a high frequency self-oscillating circuit and a modulated laser beam pulsated with coded data are used. Since this method uses the high-frequency self-oscillating magnetic field, new limited data can be directly overwritten on a disc where old data remains, but any new data cannot be overwritten directly and the shape of the formed magnetic domain does not become circular but crescent. Thus this method is also problematic in signal processing.

These conventional techniques are not suitable for overwriting any new data on a magneto-optic recording medium where old data remains recorded. Further, the shape of the formed magnetic domain would become crescent. There are also problems in the signal processing.

SUMMARY OF THE INVENTION

It is an object of the present invention to provide a magneto-optical data recording system which is capable of overwriting any code data without causing the shape of a magnetic domain to be a crescent.

A magneto-optical data recording system according to the present invention is characterized by magnetic field pulse applying means for applying a magnetic field pulse of a polarity corresponding to code data to be recorded to a magneto-optic recording medium, and means for heating the recording medium in a pulsating manner at a constant frequency synchronous with the code data to be recorded, wherein during recording the magnetic field pulse applying means applies a magnetic field pulse of a polarity corresponding to code data to the magneto-optic recording medium along its track, and the heating means continuously heats the magneto-optic recording medium in a pulsating manner at a constant frequency synchronous with the code data to thereby directly overwrite the code data.

The magnetic field pulse applying means uses a magnetic coil driven by the code data from a source of code data (data generator). The heating means preferably uses an optical head comprising a source of laser beam driven by a laser driver and an optical system for focusing the laser beam from the source of laser beam as a small light spot onto the magneto-optic recording medium. Namely, the polarity of the magnetic field pulse applied by the magnetic coil is switched in accordance with the polarity of the code data to be recorded, and laser pulses synchronous with the frequency of a data recording clock are successively emitted from the optical head while code data is directly overwritten onto the magneto-optic recording medium. The frequency of laser pulses used, are for example, the data clock frequency, and the duty cycle of the period of the data clock frequencies to the pulse width is set to 1.0 or less. In order to record each magnetic domain separately without being subjected to thermal influence, the duty cycle is preferably 0.7 or less. If the laser pulse width is extremely short, the intensity of the laser beam must be increased greatly. To this end, the laser pulse width is required to be expanded to some extent, and the duty cycle is required to be 0.1 or more and preferably 0.2 or more. As just mentioned above, laser pulses of a predetermined width phase-locked to a data clock of a predetermined frequency are emitted from an optical head to heat small regions of a moving recording medium at equal intervals periodically along a track of the medium, a magnetic field corresponding to the polarity of code data to be recorded, is generated from a magnetic coil to directly overwrite the coded data along the track. Preferably, reproduction signals indicative of embedded pits preformed at predetermined intervals periodically along the track of the magneto-optic recording medium are preferably used as the data clock. Namely, a recording medium where servo areas and data areas are alternately disposed along the track is preferably used to generate a clock signal from embedded clock pits preformatted in the servo area, and the recording of the code data is controlled based on the clock signal. Preferably, wobbled pits for tracking signal detection are preformatted together with the embedded clock pits in the servo area. The embedded clock pits can be reproduced by using the laser beam from the optical head as the heating means. In more detail, the source of laser beam is continuously oscillated at its low output in the servo area, and the reflected beam from the recording medium is extracted separately from the beam from the source of laser beam using a polarizer beam splitter provided in the optical head, and the reflected beam is detected by a photodetector to thereby reproduce the clock pits using a change in the intensity of the reflected beam. The embedded clocking means that the clock is generated by preformated clock pit. A pulse signal corresponding to a clock pit in the servo area is extracted from the output of the photodetector by a clock extraction circuit to generate a clock signal of a frequency N times the frequency of and synchronous with the extracted signal using a PLL (Phase Locked Loop). During data recording, the laser driver is controlled by this clock signal to thereby successively irradiate high-output laser pulses phase-locked to the clock signal from the optical head and a magnetic field is applied by the magnetic coil and its polarity is changed depending on the code data which is read out synchronously with the clock signal from the source of code data (data generator), whereby in this method, both of the irradiated laser beam and the magnetic field are modulated synchronously with the clock signal. Since it takes a considerable time for the applied magnetic field to rise up and fall down compared to the case of laser pulses, a phase adjuster is preferably provided which adjusts the relationship in phase between the laser pulse and the magnetic field pulse such that the laser pulse is applied under the condition where the magnetic field pulse has sufficiently risen or fallen.

According to the present invention, the laser beam and the magnetic field are modulated synchronously with the data clock signal, the laser beam is caused to locally heat the magneto-optic recording medium at equal intervals, the polarity of the magnetics field is changed in accordance with the code data, and a new magnetic domain is formed corresponding to new code data by the interaction of the laser beam, magnetic field and thin magneto-optic film. Thus, the laser beam heats the recording medium at equal intervals in a pulsating manner, so that the magnetic domain does not become crescent, which is preferable for signal processing.

When the laser, for example a semiconductor laser, is used, a pulse modulation is performed at high output in the data recording region, which is preferable for the lifetime of the laser.

BRIEF DESCRIPTION OF THE DRAWINGS

FIGS. 5 and 6A to 6E illustrate problems to be solved by the present invention.

DESCRIPTION OF THE PREFERRED EMBODIMENT

Before entering the explanation of an embodiment of the present invention, the problems to be solved by the present invention will be now described by taking a sampled servo method using an embedded clock as an example with reference to FIGS. 5 and 6A to 6E.

Figure 6A:
Figure 6B:
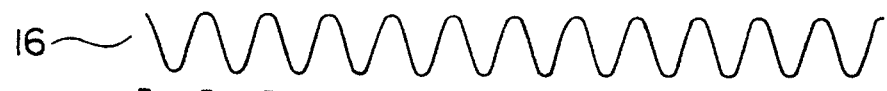
Figure 6C:
Figure 6D:
Figure 6E:
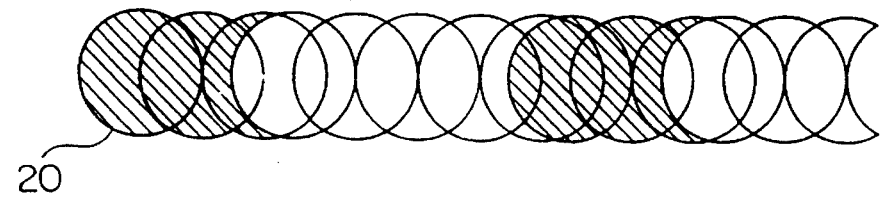

In the magneto-optical disc system using a sampled method, each of tracks 2 on a disc is divided into 1000–2000 segments 3, as shown in FIG. 5A. Each segment 3 is divided into a servo area 4 where information to control the system is recorded beforehand and a data area 5 where the user records code data. Formed in each servo area. 4 are pits 6 for detecting a tracking signal and an embedded clock pit 7 to generate a clock for a data signal. In order to control the flow of the code data signal, a data channel clock 9 (FIG. 5(C)) is generated by a PLL from a signal 8 (FIG. 5(B)) comprising the reproduction of an embedded clock pit 7 using the laser beam. The clock 9 is, for example, about 10 MHz. According to the system disclosed in the JP-A-52-23318, when code data 10 is overwritten onto the data recording area 5, the laser beam is modulated with code data 10 in the data area 5. In the case of the code data 10, for example, (11001), on the disc, a small area in which the code corresponding to the "1" is recorded is heated to hundreds of degrees ° C. with the modulating light 11 (FIG. 5(D)) and magnetic domains 13 (FIG. 5(A)) are formed using a direct current magnetic field 12 (FIG. 5(E)) generated by the magnetic coil. With such conventional techniques, a magnetic domain 13 of new data is formed in the data area 5 with no old data magnetic domain 14 being erased undesirably. FIGS. 6A to 6E illustrate a method employed by the JP-A-62-252553. According to this method, a high-frequency alternating magnetic field 16 (FIG. 6B) self-oscillated by the clock 15 (FIG. 6A) is applied to the disc face during recording. At this time, magnetic domains 20 corresponding to the magnetic fields 19 facing upwardly or downwardly as shown in FIG. 6D are formed by applying laser pulses 18 synchronously with the position of a positive or negative peak of the high-frequency alternating magnetic field 16 in accordance with data to be recorded. Thus, by successively forming magnetic domains in the same direction, as shown in FIG. 6E, the magnetic domains 20 are superposed one on the other to thereby allow a magnetic domain 20 of any length to be recorded. However, according to this method, the peripheral configuration of the recorded magnetic domain 20 is not smooth but like chained balls, so that the S/N ratio of the reproduced signal is deteriorated. The timing of irradiation of each laser pulse 18 is locked to the position of a positive or negative peak of the high-frequency alternating magnetic field 16 in accordance with "1" or "0", of recorded data, so that there is the problem that recorded magnetic domains 20 are likely to remain unerased.

The present invention solves these problems. It is an object of the present invention to provide a magneto-optical data recording system in which the shape of a magnetic domain is not crescent but circular, and any code data can be easily overwritten with no unerased data portion remaining.

Figure 1:
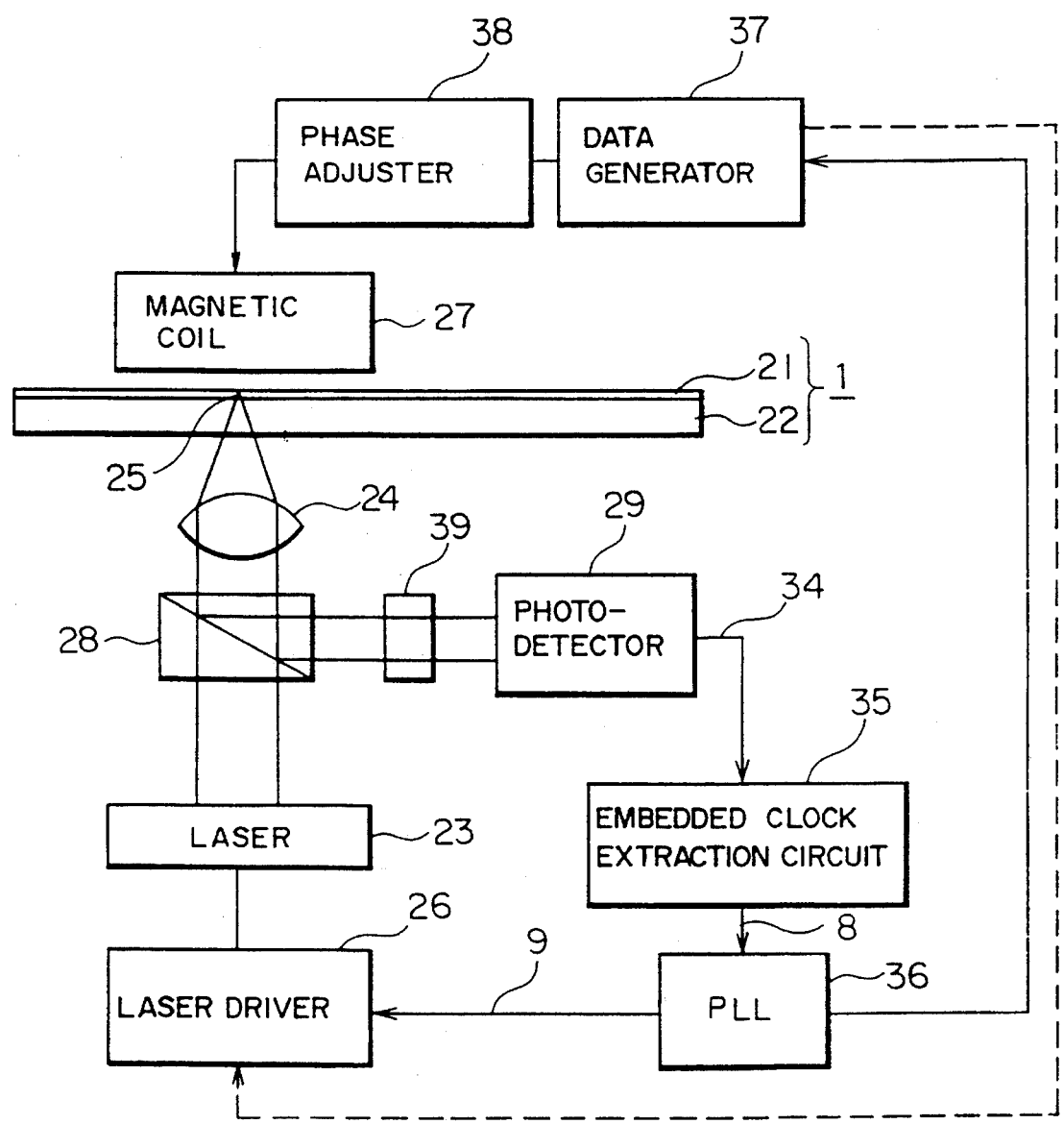
FIG. 1 illustrates a magneto-optical disc system as one embodiment of the present invention.

FIG. 1 shows a magneto-optical data recording system as one embodiment of the present invention. FIGS. 2, 3 and 4A to 4B illustrate the operation of the system. In FIG. 1, reference numeral 1 denotes a magneto-optic disc which is rotated by a rotary mechanism (not shown) such as a rotary motor. It includes a thin magneto-optic film 21 and a transparent disc 22 on which the film 21 is formed. A protective film (not shown) is formed on the thin film 21 as needed. Light emitted by a laser 23 is focused by an optical system 24 comprising a collimeter lens which converts the emitted light to a collimated beam and a focusing lens which focuses the laser beam to form a light spot 25 onto the thin film 21 via the disc substrate 22. The reflected light from the disc 1 is separated and extracted by a polarizer beam splitter 28 from the laser beam emitted by the light source 23, the rotation of the polarization plane caused by recorded data on the magnetic optical disc is converted to the corresponding light quantity via an analyzer 39, and the light quantity is subjected to photoelectric conversion by a photodetector 29. Instead of the analyzer 39, a λ/2-plate and a polarizer beam splitter may be used to separate the reflection from the disc into S and P polarization components, which are then detected by the corresponding photodetectors, the outputs of which are subtracted one from the other, so that the difference results in a magneto-optical signal and the sum of the outputs results in a prepit signal. The light spot 25 irradiated by the optical head is controlled in an auto-focusing manner such that it is focused at all times onto the thin film 21 following upward and downward swings of the disc 1, and is subjected to tracking control such that the light spot is positioned at all times onto a desired track following the eccentricity of tracks on the disc. These servo techniques are well known and will not be described further. For example, focus control is described in U.S. Pat. No. 4,561,082 in which a non-recording area for focusing purposes is provided in a servo area where a deviation of the focus is detected by sampling. The focus control is also described in U.S. Pat. No. 4,742,218 in which the reflected light from the disc is split into two light beams which are focused before and after photodetectors, a focus deviation is detected by the difference between the outputs of both the photodetectors, a focusing lens is moved in the optical axis direction in accordance with the degree of the focus deviation. Tracking control is disclosed in, for example, U.S. Pat. No. 4,707,816 and U.S. Pat. No. 4,748,609 in which a track deviation is detected by using a pair of pits wobbled right and left with reference to the center line of the track. Of course, the optical head comprising the laser light source 23, optical system 24, photodetector 29, etc., are arranged to be movable radially of the disc 1.

A magnetic coil 27 is provided on the opposite side of the disc 1 from the optical head and constructed such that its magnetic polarity is controlled by the code data from a data generator 37 during recording. The magnetic coil 27 is integrally coupled to the optical head and a support structure (not shown) thereof so as to be provided directly above the light spot on the disc to be thereby moved together with the optical head and support structure. The magnetic coil 27 is preferably a floating type magnetic head combined with a floating slider (not shown).

The laser 23 is driven by a laser driver 26 such that it continuously oscillates at its low output power during reproduction and emits laser pulses at its high output power during recording. The magnetic coil 27 applies to the disc a magnetic field of a polarity corresponding to code data to be described during recording to perform reproduction and recording.

Figure 2:
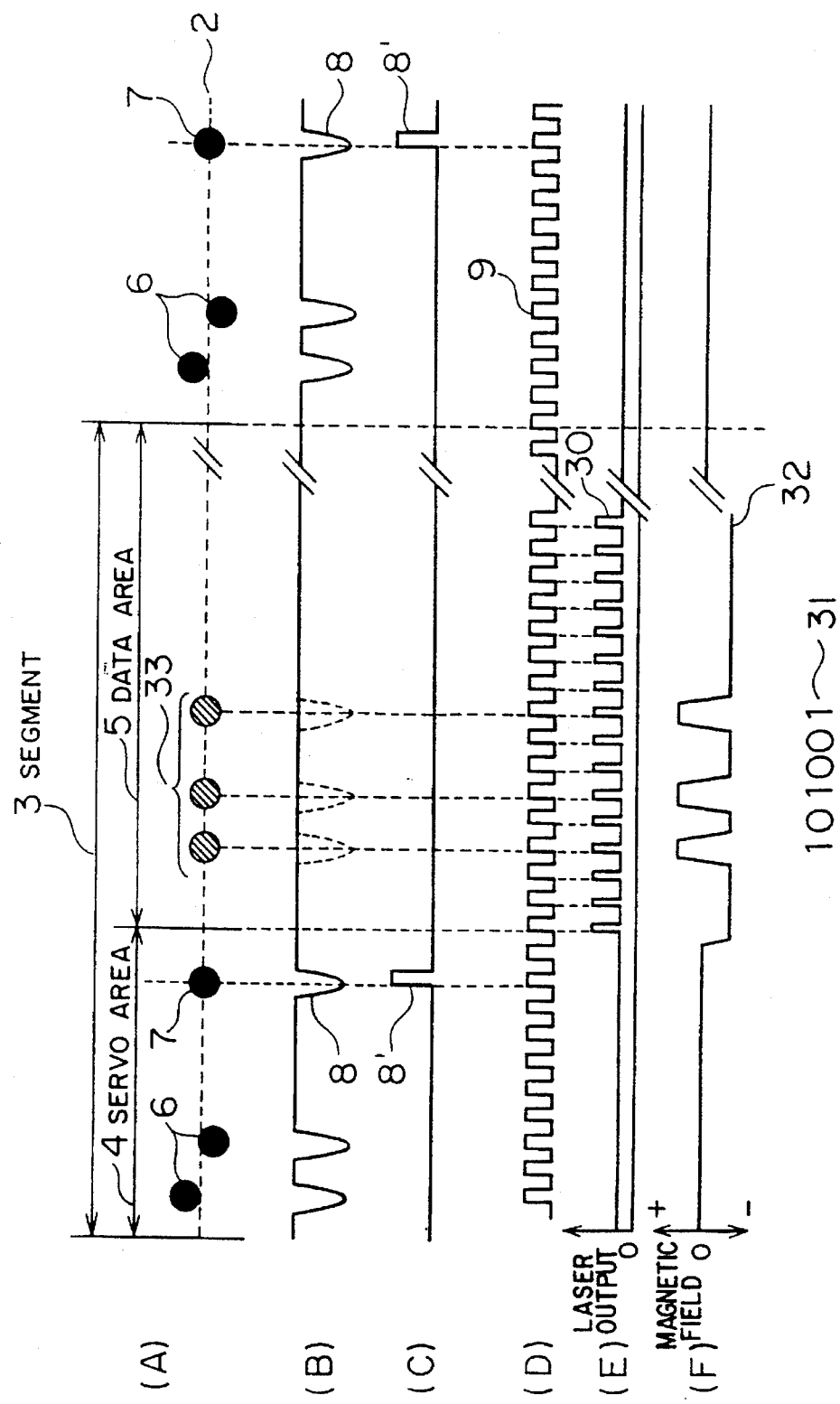
FIG. 2 illustrates waveforms explaining the operation of the disc system.

FIG. 2 illustrates that operation and illustrates the relationship between modulating pulses from the laser 23 of FIG. 1 and the polarity of the magnetic field from the magnetic coil 27.

As shown in FIG. 2A, each of the tracks 2 on the disc 1 is divided into a plurality of (for example, 1000–2000) segment 3, each being beforehand divided into a servo area 4 in which data to control the system is recorded beforehand and a data recording area 5 in which the user records code data. Formed in each servo area 4 are a pair of wobbled pits 6 for detecting a tracking signal and an embedded clock pit 7 to control the clock for the data signal. The wobbled pits 6 are equal in quantity and provided one on each side of the center line of the track 2, and the clock pit 7 is provided on the center line of the track 22. If a light spot scans along the center line of the track 2 of FIG. 2(A), the photodetector outputs a signal shown in FIG. 2(B) as an intensity change of the reflected light. The reproduced signals obtained from the pair of wobbled pits 6 are equal in level when the light spot scans along the center line of the track 2. If the light spot deviates from the center line of the track 2, one of the levels of the reproduced signals is lowered and the other level rises to cause an unbalance, so that a track deviation signal is obtained by detecting the difference in level between the reproduced signals from the pair of wobbled pits 6. Techniques to obtain a track deviation signal from such wobbled pits are disclosed in the above mentioned U.S. Pat. No. 4,707,816 and U.S. Pat. No. 4,748,609. If 1000–2000 pairs of such wobbled pits are disposed along the periphery of the track and track deviation signals obtained from these pairs of wobbled pits are sampled at high frequency (at 30–40 KHz), servo signals over the entire zone (DC - 3 KHz) necessary for tracking can be obtained. The code data is recorded and reproduced in the data area 5 while controlling the position of irradiation of the light spot such that it scans the center line of the track 2 using the servo signals. The tracking servo techniques are well known and omitted in FIG. 1.

A process for obtaining a clock signal from the embedded clock pits 7 will now be described. A pulse signal 8' indicative of the position of the peak of a signal 8 corresponding to a clock pit 7, namely, the central position of the clock pit 7, is obtained from the reproduced signal shown in FIG. 2(B) (FIG. 2(C)). This signal can be easily obtained by differentiating the reproduced signal in FIG. 2(B) and detecting its zero point. This pulse signal 8' is extracted by an embedded clock extraction circuit 35, and a data clock (FIG. 2(D)) synchronous with the signal 8' which has a frequency N times that of the signal 8' is generated using the PLL 36. The technique for obtaining a data clock from embedded clock pits is disclosed in detail in U.S. Ser. No. 169,597, now U.S. Pat. No. 4,949,325 filed by some of the inventors.

The present invention is characterized in that both of the irradiated laser beam and applied magnetic field are modulated synchronously with the data clock 9. The data generator 37 is controlled in accordance with the data clock 9, the magnetic coil 27 is caused to produce a magnetic field pulse of a polarity corresponding to the code data read from the data generator 37 synchronously with the data clock, which is also used to control the laser driver 26 to cause the optical head to continuously irradiate onto the disc high-output laser pulses phase-locked to the data clock during data recording to thereby heat continuously the disc in a pulsating manner at constant frequencies synchronous with the code data and to hence record the code data in the data area 5. This operation will now be described in more detail with reference to FIG. 2 ((E) and (F)).

As shown in FIG. 2(E), the laser 23 is continuously oscillated at its low output by the laser driver 26 in the servo area 4 to read preformatted pits such as wobbled pits 6 or a clock pit 7. The intensity of the laser is modulated in the data area 5 synchronously with the clock 9 during recording to emit successive high-output light pulses 30 narrow in width (for example, 30 ns) to locally heat the thin film 21 at equal intervals in the data area 5 of the segment 3 on the rotating disc 1.

Figure 3:
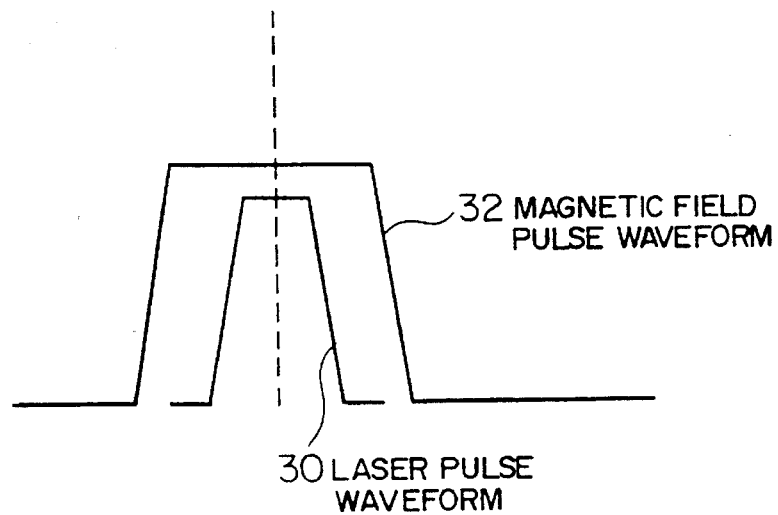
FIG. 3 illustrates the details of the waveform.

Assume now that new code data 31 to be written into the data area 5 is, for example, (101001). The code data 31 is generated from the data generator 37 synchronously with the data clock 9. The polarity of the magnetic field produced by the magnetic coil 27 is set to be "+" if the code is "1", and is set to "−" if the code is "0" to thereby form magnetic pulses of polarities (+ − + − − +) 32 (FIG. 2(F)), which are applied to the areas which are locally heated at equal intervals in the data area 5 by the laser pulses 30. As a result, domains 33 corresponding to data (101001) to be newly written are formed in the data area 5. At this time, as shown in FIG. 3, if the applied magnetic field pulse is wider than the laser pulse, the deviation of the position of the domains 33 in which data is recorded is reduced. The relationship in phase between the laser pulse 30 and the magnetic field pulse 32 is set such that the laser pulse 30 is applied under the condition where the magnetic field pulse 32 has sufficiently risen or fallen. The adjustment of this phase can be made by a phase adjuster 38 shown in FIG. 1. In order to reproduce the domains recorded in the data area 5, the laser 23 is continuously oscillated at its low output also in the data area 5 as in the servo area 4. In that case, the magnetic coil 27 is not driven.

Figure 4A:
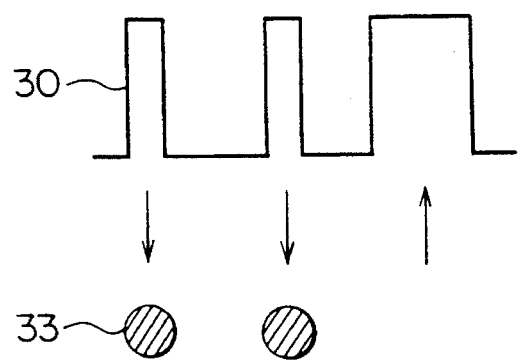
FIGS. 4A and 4B are each a waveform illustrating an improvement according to the present invention.
Figure 4B:
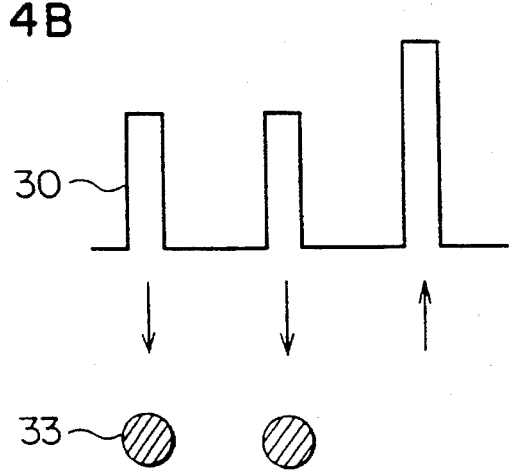

While in the above description the power of the laser pulse 30 synchronous with the data clock 9 has been described as being constant, the energy of the laser pulse may be changed in accordance with code data to be recorded. As shown in FIGS. 4A and 4B, when code data "0" is to be recorded in the same direction of magnetization as the magneto-optic medium is initially magnetized (FIGS. 4A and 4B show the recording of the code "0" in the direction of initial magnetization and the code "1" in the direction opposite to the direction of initial magnetization. Conversely, the code "0" may be recorded in the direction of initial magnetization and the code "1" may be recorded in the direction opposite to that of initial magnetization.), the width of the laser pulse 30 is increased slightly compared to the recording of the code data "1" in the opposite direction (FIG. 4A), the power of the laser pulse 30 is increased (FIG. 4B) or both these processes are performed to eliminate possible unerased recording domains 33. As just described above, in order to change the energy of the laser pulses in accordance with code data to be recorded, the code data read from the data generator 37 is required to be delivered to the laser driver 26 to change the width, level or both of a current pulse delivered to the laser 23 in accordance with the code data.

Since each domain 33 formed by the present invention is only heated instantaneously with a single light pulse 30, the thin film 21 is not overheated for longer time. Therefore, the formed domain does not become crescent but circular, and the magneto-optical reproduced signal is not delayed in phase and a satisfactory error rate is obtained.

As just described above, according to the present invention, the laser beam is caused to locally heat the disc at equal intervals with the laser beam being phase-locked to the frequency of the data channel clock, and the polarity of the magnetic field is modulated with code data to be newly written to thereby form domains on the disc and hence to overwrite new code data easily.

We claim:

1. An information recording apparatus comprising:
   a recording medium having a servo area for at least providing tracking control and a data area alternating along a track of the recording medium, the servo area including at least one embedded pit utilized for generating at least one of a tracking control signal and a clock signal;
   first means for applying a magnetic pulse having a polarity corresponding to data to be recorded to the recording medium;
   signal generating means for generating a reproducing signal corresponding to the at least one embedded pit;
   clock means for generating the clock signal having a frequency synchronized with a frequency signal obtained from the reproducing signal, the frequency of the clock signal being N times the frequency signal, N being a value greater than 1;
   second means for continuously irradiating optical pulses in synchronism with the frequency of the clock signal; and
   third means for generating the magnetic pulse by modulating the data synchronized with the frequency of the clock signal.

2. An information recording apparatus according to claim 1, wherein the recording medium includes a plurality of data areas, the second means continuously irradiates the optical pulses at least over an entire respective one of the plurality of data areas of the recording medium at a frequency in synchronism with the frequency of the clock signal.

3. An information recording apparatus according to claim 2, wherein an entire respective one of the plurality of data areas is delimited between servo areas of the recording medium along the track of the recording medium.

4. An information recording apparatus according to claim 3, wherein the second means irradiates an optical pulse for each clock signal.

5. An information recording apparatus according to claim 1, wherein the servo area includes a plurality of embedded pits.

6. An information recording method comprising the steps of:
   preparing an optical recording disk having a servo area at least providing tracking control and a data area alternating along a track, the servo area including at least one embedded pit;
   irradiating a light spot on the servo area;
   obtaining an electric signal in accordance with a light intensity from the servo area, the electric signal being modulated by the at least one embedded pit of the servo area;
   generating a timing pulse in accordance with the electric signal;
   generating a clock signal having a frequency synchronized with the timing pulse, the frequency of the clock signal being N times the frequency of the timing pulse;
   generating a servo signal in accordance with the electric signal;
   continuously irradiating light pulses in synchronism with the frequency of the clock signal on the track under tracking control in accordance with the servo signal; and
   modulating a magnetic field by a data signal synchronized with the frequency of the clock signal so as to form a data domain by the heating effect of the light pulses and a magnetic field.

7. An information recording method according to claim 6, wherein the servo area includes a plurality of embedded pits.

8. An information recording apparatus comprising:
   a recording medium having a servo area and data area alternating along a track, the servo area having at least one embedded pit including at least one pair of wobbled pits providing at least tracking control;
   a clock generator for generating a clock signal having a frequency synchronized with a frequency signal obtained from the at least one embedded pit of the servo area;
   a light source for continuously irradiating light pulses on the data area in synchronism with the frequency of the clock signal; and
   a magnet for applying a magnetic field pulse having a polarity corresponding to data to be recorded on the data area, the magnetic field pulse being synchronized with the frequency of the clock signal.

9. An information recording apparatus according to claim 8, wherein the frequency of the clock signal is N times the frequency signal obtained from the at least one embedded pit, N being a value greater than 1.

10. An information recording apparatus comprising:
    a recording medium including a servo area and a data area alternating along a track, the servo area having at least one embedded pit including at least one pair of wobbled pits providing at least tracking control;
    a clock generator for generating a clock signal having a frequency synchronized with a frequency signal obtained from the at least one embedded pit of the servo area;

a light source for continuously irradiating light pulses on the data area in synchronism with the frequency of the clock signal;

a magnet for applying magnetic field pulses having a polarity corresponding to data to be recorded on the data area, the magnetic field pulses being synchronized with the frequency of the clock signal; and a pulse adjuster for adjusting a phase of the light pulses and the magnetic field pulses.

11. An information recording apparatus according to claim 10, wherein the servo area includes a plurality of embedded pits.

12. An information recording apparatus according to claim 10, wherein the pulse adjuster shifts the phase of the magnetic field pulses.

13. An information recording method comprising the steps of:

preparing an optical recording disk having a servo area and a data area alternating along a track, the servo area having at least one embedded pit for tracking control;

irradiating a light spot on the servo area;

obtaining an electric signal in accordance with a light intensity from the servo area, the electric signal being modulated by the least one embedded pit of the servo area;

generating a timing pulse in accordance with the electric signal;

generating a clock signal having a frequency synchronized with the timing pulse;

generating a servo signal in accordance with the electric signal;

continuously irradiating light pulses on the track under tracking control in accordance with the servo signal, the light pulses being irradiated in synchronism with the frequency of the clock signal;

modulating a magnetic field by a data signal synchronized with the frequency of the clock signal; and adjusting a phase of the light pulses and the magnetic field so as to form a data domain by the heating effect of the light pulses and the magnetic field.

14. An information recording method according to claim 13, wherein the frequency of the clock signal is N times the frequency of the timing pulse, N being a value greater than 1.

15. An information recording method according to claim 13, herein the servo area includes a plurality of embedded pits.

* * * * *